United States Patent [19]

Legros

[11] Patent Number: 5,152,058
[45] Date of Patent: Oct. 6, 1992

[54] REPAIR OF TURBINE BLADES

[75] Inventor: Raymond D. Legros, Worcester, England

[73] Assignee: Turbine Blading Limited, Droitwich, England

[21] Appl. No.: 711,819

[22] Filed: Jun. 7, 1991

[30] Foreign Application Priority Data

Jun. 21, 1990 [GB] United Kingdom ............... 9013815

[51] Int. Cl.$^5$ ............................................. B21K 3/04
[52] U.S. Cl. ................................... 29/889.1; 29/889; 228/119
[58] Field of Search .................. 29/889.1, 889, 402.03, 29/402.04, 426, 426.4; 228/119

[56] References Cited

U.S. PATENT DOCUMENTS

| | | | |
|---|---|---|---|
| 4,451,979 | 6/1984 | Schuster | 29/889.1 |
| 4,611,744 | 9/1986 | Fraser et al. | 29/889.1 |
| 4,951,390 | 8/1990 | Fraser | 29/889.1 |

FOREIGN PATENT DOCUMENTS

| | | | |
|---|---|---|---|
| 0013772 | 8/1980 | European Pat. Off. | 29/889.1 |
| 2198667 | 6/1988 | United Kingdom | 29/889.1 |

Primary Examiner—Irene Cuda
Attorney, Agent, or Firm—Armstrong & Kubovcik

[57] ABSTRACT

A method of repairing rotor blades on a turbine comprises the steps of removal of a rotor from the turbine, selecting predetermined desired position of the blades and, after removing any inter blade ties necessary to enable any required repair processes to be carried out, aligning all the blades to said predetermined aligned position prior to the carrying out of any repair step which may incorporate cutting, welding, machining etc., such alignment considerably facilitates semi-automated repair of each blade and has further benefits in facilitating reinsertion of inter blade ties and ensuring that the blades are not only in an aligned position but in a stress free condition when returned to the turbine.

15 Claims, 4 Drawing Sheets

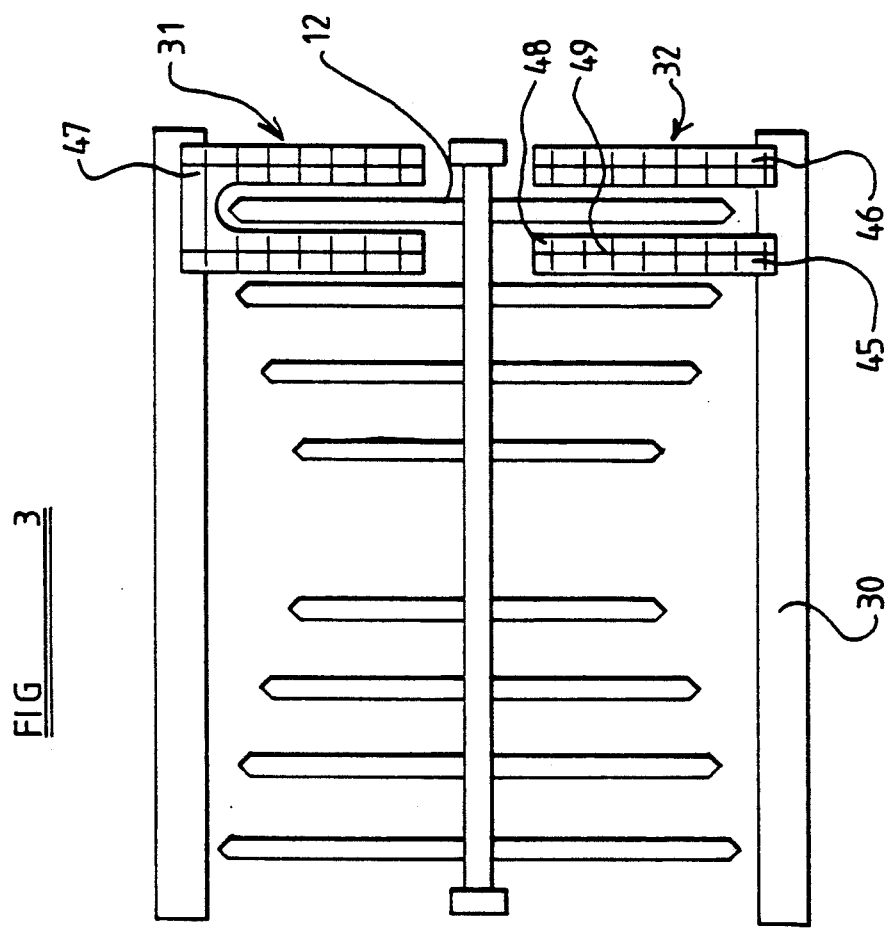

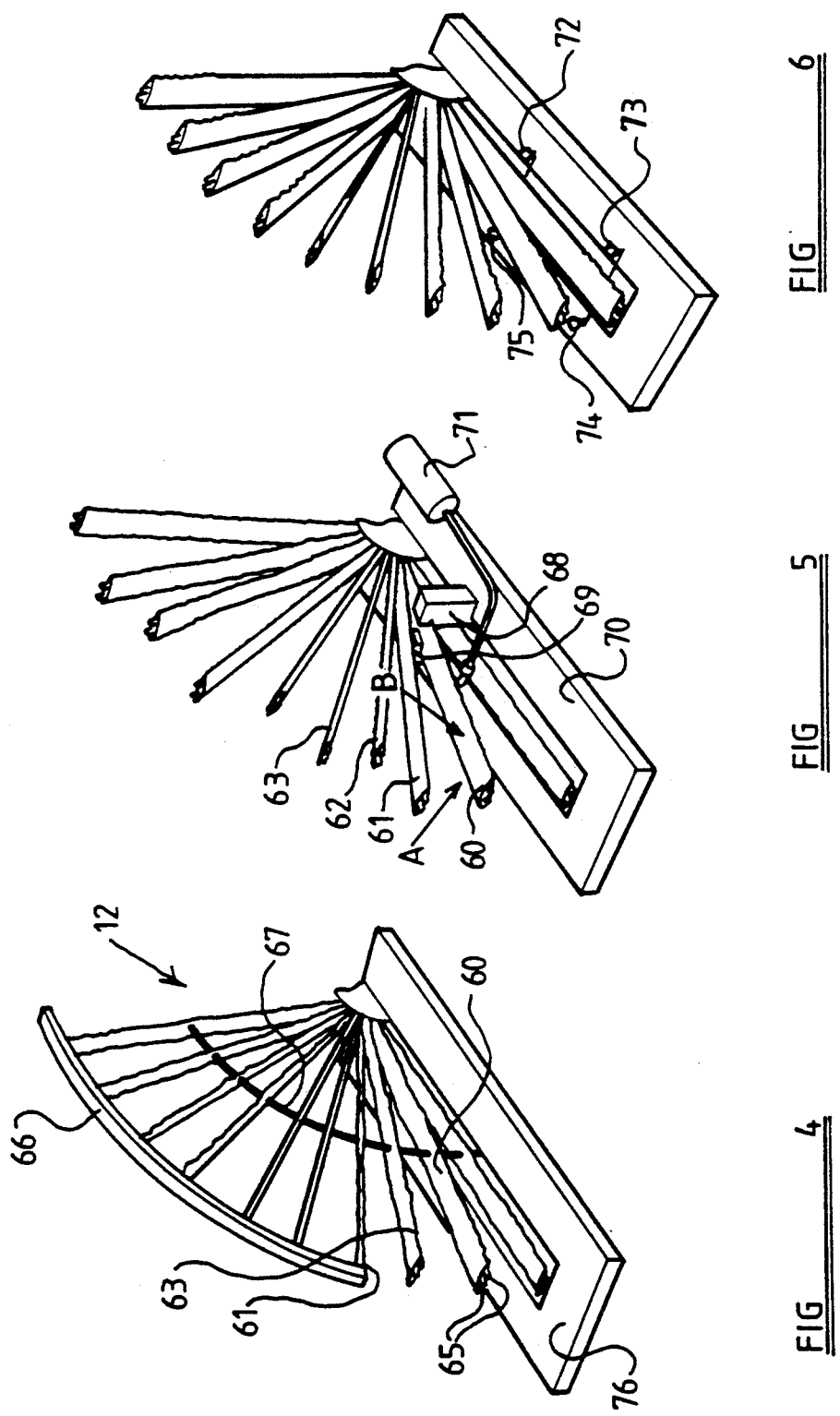

REPAIR OF TURBINE BLADES

BACKGROUND OF THE INVENTION

The present invention relates to a method of repairing turbine blades.

Turbine blades on rotors and stators are subjected to wear and damage during use and after a certain period of use servicing of the rotors and/or stators is necessary, such servicing often requiring welding operations to be carried out to the blades on the rotor to repair damaged or eroded parts.

It has been proposed by the applicants that repairs to turbine blades wherever possible are carried out with the blades in situ on the rotor thereby obviating their removal, which operation is not only time consuming but can in itself cause considerable damage to the rotors or blades and necessitates the removal of cover bands, shrouds, lacing wires etc.

U.S. patent application Ser. No. 07/53996, filed Jun. 18, 1990, discloses apparatus to support a rotor, which apparatus also includes a work station to enable repair operations to be carried out on turbine blades in an array of blades on a rotor without their removal from the rotor.

Whereas such apparatus has been found to be highly successful and enables swift and accurate repairs to be carried out to the blades, quite considerable time can be spent in setting up the machining apparatus, drills, cutting apparatus etc.

The main reason for the considerable expenditure of time is that repair on the blades which normally necessitates removal of lacing wires, cover bands or other blade tying or damping means, results in the blades being considerably misaligned from a normal in-use position and not only misaligned but misaligned relative to each other.

There can be various reasons for such misalignment, if lacing wires are not continuous there is a tendency for the end blades in a package of blades, the end blade only being effectively tied to a blade on one side rather than both sides, for that blade to move or unwind during use of the turbine and removal of the lacing wires accentuates such unwinding.

Furthermore, in some cases the blades may have been poorly manufactured or installed on the rotor and, since lacing wire holes would have been pre-drilled, the blades would have been physically forced into a position so that the lacing wires can be threaded through the blade and thus on their removal the blade will immediately take up a misaligned position.

It will be appreciated that a very small error in securing the blade at its root end can, particularly in the case of a blade of considerable length in excess of one meter, for example, result in the tip of the blade being considerably displaced from its proper position.

The tendency for previously tied blades released from their "tied condition" to take up positions considerably displaced from their normal in-use aligned position not only causes considerable problems when it is required to carry out intricate welding and machining on the blades to carry out any necessary repair, but since it is also necessary to eventually return the blades to their proper position, this may require the application of considerable physical force and possibly heat after the repair has been carried out and possibly after heat treatment processes have been carried out in order to restore the blades to the correct position.

Such may be the application of physical force and heat that further heat treatment processes may then be necessary further prolonging the time taken for the total repair of the turbine.

Furthermore, where machining such as the re-drilling of lacing wire holes is to be carried out, if the blades are not in an aligned position it can be very difficult to accurately drill the holes so that the lacing wires can be successfully re-threaded through the blades.

SUMMARY OF THE INVENTION

It is an object of the present invention to provide a new or improved method of repair of turbine blades that facilitates the repair in situ of turbine blades on the rotor.

According to one aspect of the present invention, we provide a method of repairing turbine blades on a rotor comprising the steps of:
1. determining an aligned position of the turbine blades on the rotor;
2. removing any inter-blade ties necessary to be removed to permit the repair operations to be carried out on the blade; and
3. acting on any out-of-aligned blade to return it to its aligned position prior to cutting, machining or welding of the blade during said repair operation.

The apparently unnecessary step of aligning all the blades to an aligned position prior to any repair step requiring cutting, machining or welding of the blades has an appreciable advantage during the repair of the blades in that each blade to be repaired is in its correct position and thus machinery for cutting, machining, or drilling the blades can be accurately set up and hence be in a correct position to carry out an identical repair on all the blades to be repaired and if required such machinery can be computer controlled so as to automatically carry out repair operations on a succession of identical blades in the array and, in view of the initial alignment procedure, each blade will be acted on in precisely the same way as other blades in the array.

Furthermore, the step of aligning the blades prior to any machining or welding, for example, has resulted in the step of the final alignment of blades after repair has been carried out being a much easier operation than has hitherto been the case.

Since in most overhauls of rotors which often require a similar or identical repair to be carried out on each or most of the blades, the distortion that occurs to the blade during repair may to a certain extent be counteracted by the application of heat to the blade during welding.

Such a method is described in British patent No. 2,124,126. Thus after the repair step has been carried out, only minor adjustment if any to the blade is necessary to return it to its proper aligned position.

Furthermore, since the repairs as aforementioned which are carried out on each blade are similar, any distortion of each blade is likely to be similar whereas without the pre-alignment step the blades may be in a variety of different distorted positions.

Preferably the alignment of the blades is carried out by the application of physical force or by deliberate distortion through the effect of heat applied to the blade or by a combination thereof.

In some instances where the blades are of a size where considerable force would be necessary to realign the blade to its aligned position, parts of the blades may have heat applied thereto to render that part of the blade more malleable and hence reduce the physical force that needs to be applied to the blade and be effective in returning the blade to its aligned position.

Preferably said method is carried out in conjunction with the apparatus, the subject of the aforementioned U.S. patent application Ser. No. 07/539,996, which corresponds to British patent application 8914156.8 which provides not only for a stand for a rotor but also for a work station adjacent the blade to be repaired and clamping means may be provided on the work station to hold one part of a blade to be aligned while a physical force may be applied to another part of the blade to cause the blade to take up its correct aligned position.

Alignment means may be provided on the work station to indicate when the blade has been brought to an aligned position.

It is further envisaged that an aligned position may be different from an "in use" aligned position since each blade may be purposely set in an "aligned" position in order to counteract distortion that might be expected to occur during a repair step, for example a repair step involving the application of considerable thermal energy such as may occur during welding of a new piece of material to the blade, so that after said welding operation the blade is in or relatively close to its "in use" aligned position and thus requires a relatively small amount of force to return it to its "in use" aligned position.

The predetermined aligned position of the blade may be chosen to be the position of the blade in accordance with the manufacturer's specifications or it may be that a different aligned position may be chosen and such a different aligned position may well be determined by the relationship or positioning of the stator blades with respect to the leading edge of the rotor blades, the distance and positioning between stator blades, buckets or nozzles and the leading edge of the rotor blades being critical for the efficiency of the turbine.

A highly satisfactory method of establishing a predetermined aligned position of a blade can be established before removing the rotor from a stator of the turbine and before removing any of the ties such as lacing wires, cover bands, for example, by finding which blade or blades on the rotor is aligned relative to the stator blades in a position that is known to be, or at least close, to the optimum position of a rotor blade.

Once such a blade has been found this may be used as a datum blade and the blade can be so marked. The rotor is then removed from the turbine and may be placed on a worktable as described in British patent application 8914156.8.

Before removing any of the cover bands, lacing wires etc., the position of the datum blade is carefully noted with various gauge means so that the position of the blade relative to the work table is accurately known.

It is then possible to remove all lacing wires, cover bands etc., that have to be removed to enable the repair to take place and movement of blades does not now matter since the datum position or predetermined aligned position has been recorded.

A suitable operation may then be carried out on the blade by means of physical force and heat if necessary so as to re-align each blade in the aforesaid predetermined aligned position.

It is envisaged that in some cases due, for example, to an undersized blade some compromise may be necessary. However, once the predetermined aligned position is known it is possible to carry out an operation on each blade to move that blade as near as possible to said position.

It is also envisaged that in addition to bending of the blades so that they may be aligned with each other, they may also be twisted about their longitudinal axis by the application of tools to the blades at one or more positions, the blades being clamped if desired to hold a part or parts of the blade in certain positions while other parts are distorted.

Preferably after any repair or alteration has been carried out to the blades, they are subject to stress relieving heat treatment by the controlled application of heat. This is particularly relevant where heat has to be applied to the blade to effect the required alignment of the blades and/or heat is applied to the blade during any repair step, for example welding or brazing.

The method of alignment of the present invention has been found to provide a very significant improvement in the time taken to carry out repair steps on blades in a rotor. Furthermore, particularly where pre-distortion is also carried out, after repair it has been found that the blades in a rotor array may be relatively quickly and easily re-set to their "in use" aligned positions without the application of any great physical force which has the additional benefit in that less stress will be imparted to the blades after the repair has been carried out.

It is envisaged that stress relief operations may be carried out to the blades before any repair steps are taken but after the alignment of the blade in a predetermined aligned position.

It will be appreciated that in some cases some blades may be badly misaligned and hence considerable force and perhaps considerable heat may have to be applied in order to return the blades to their proper position.

It is advantageous that a stress heat treatment process is carried out at that stage so that the blade is in a predetermined aligned position free from stress.

Inevitably the stress relieving heat treatment process may tend to cause the blade to take up a position some way intermediate its misaligned position and its predetermined aligned position. It is envisaged however that where there is considerable misalignment and it is required for heat treatment processes to be carried out prior to repair, then some compensatory bending or twisting to the blade may be carried out so that the blade is moved from its misaligned position through its predetermined aligned position to a still further position and, after stress relief it will take up a stressed free state in its predetermined aligned position.

The benefits of being able to work on each blade in a stress free condition in a predetermined aligned position are enormous in the saving of time since resetting of machines is not necessary and furthermore, after the repair has been carried out little or no corrective treatment will be necessary to return the blades to their aligned position and further stress relieving treatments that may be necessary to counteract the input of considerable thermal energy, during welding for example, are not likely to cause movement away from the predetermined aligned position but is likely to return the blade to its aligned position if some movement away from that aligned position had been caused by a welding operation, for example.

Thus, after final stress relief each blade in an array is likely to be in its aligned position in a virtually stress free state. This ensures that the lacing wires may be re-threaded without any force having to be applied to the blade to move them into an aligned position hence leaving the rotor as a whole in an ideal state for use.

BRIEF DESCRIPTION OF THE DRAWINGS

The invention will now be described in more detail by way of example only with reference to the accompanying drawings, wherein:

FIG. 3 is a plan view of the arrangement shown in FIG. 1;

FIG. 4 illustrates the turbine blades of a single array;

FIG. 5 illustrates the blades shown in FIG. 4 after removal of the shroud and lacing wire;

FIG. 6 shows the aligned array.

DESCRIPTION OF THE PREFERRED EMBODIMENTS

Figure 1:
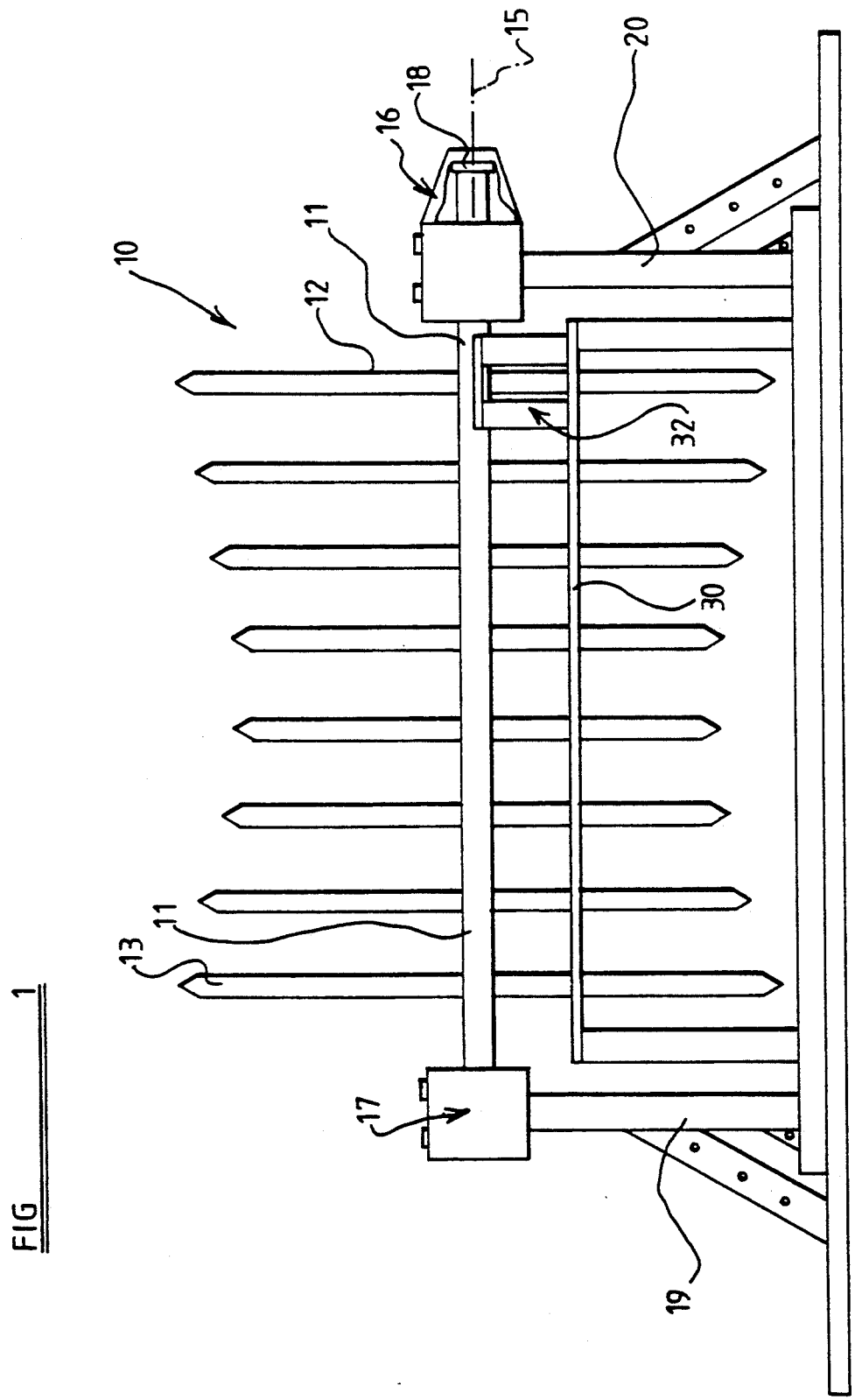
FIG. 1 is a diagrammatic view of a turbine rotor on a stand.
Figure 2:
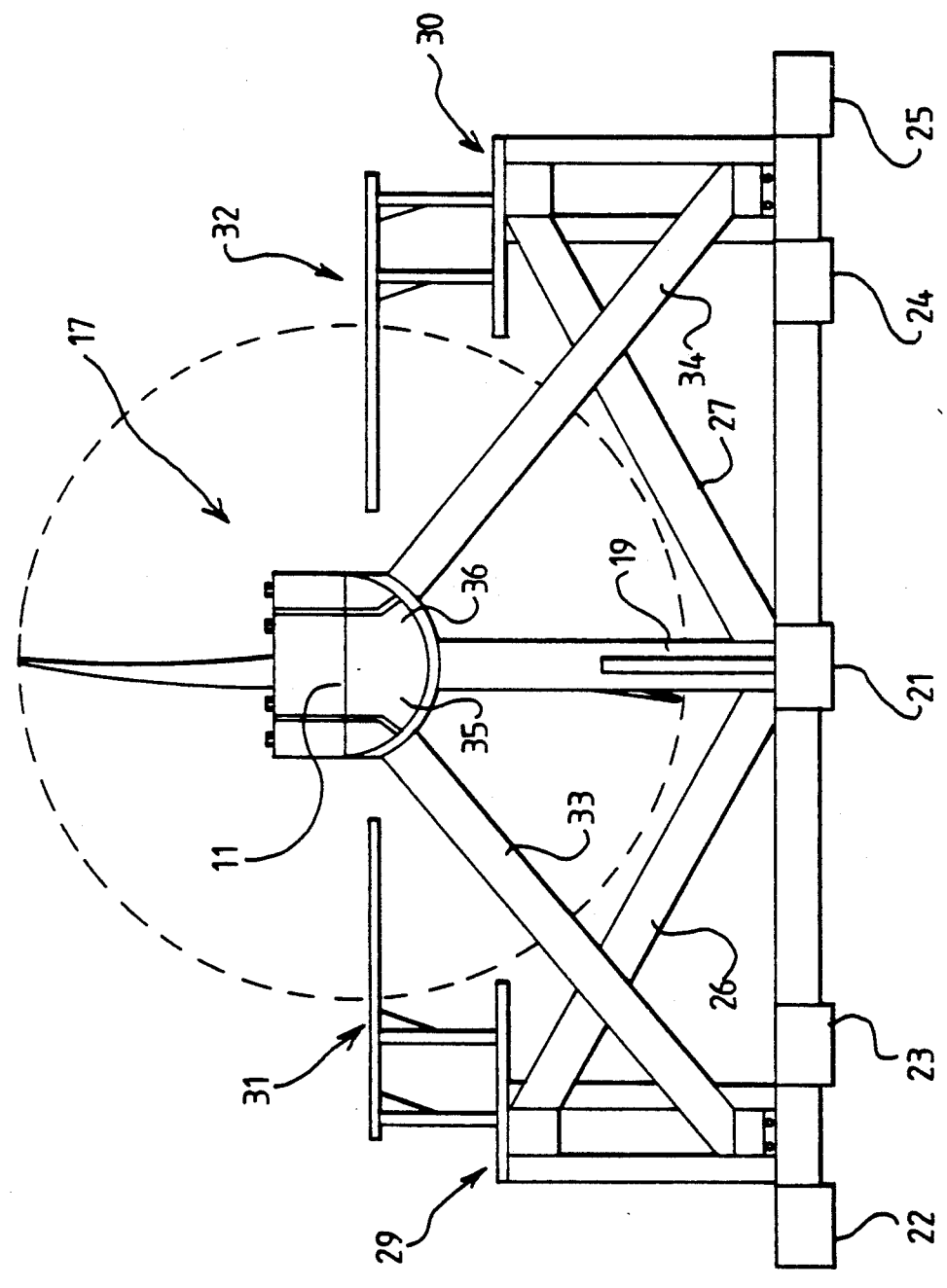
FIG. 2 is an end view of the rotor and stand shown in FIG. 1.

Referring first to FIGS. 1 to 3 a rotor is indicated at 10 and comprises a shaft 11 and a plurality of arrays of blades, for example those indicated at 12 and 13.

The shaft 11 is mounted for rotational movement about its longitudinal axis 15 and is supported on bearings generally indicated at 16 and 17.

The bearing 16 includes a thrust bearing 18 to prevent undesired movement along the axis 15 of the rotor 10.

The bearings 17 and 18 are supported by uprights 19 and 20 respectively from a primary base member 21 and lateral base members 22, 23, 24 and 25.

Bracing members 26, 27 and 33, 34 connect the upright 19 to the base members 21 to 25 and also to work platforms generally indicated at 29 and 30, one of which is located on each side of the support stand.

Similar bracing members are provided connecting the upright 20 to the base members and work platforms.

The work platforms 29 and 30 are provided with work stations generally indicated at 31 and 32 respectively.

The bearing 17 is shown diagrammatically in FIG. 2 and it can be seen that the shaft 11 is supported by roller members 35 and 36 to enable the whole rotor to be rotated about its axis 15. The other bearing 16 will be provided with the rollers similar to those shown at 35 and 36.

In order to carry out repairs on the blades of the rotor and the alignment method of the present invention it is only required to rotate the rotor very slowly so that each blade in the array in turn may be brought into register with the work station 31 or 32.

The work stations 31 and 32 may be of any suitable form and may take the form of a single elongate work surface as shown at 45 and 46 on work station 32 or alternatively may comprise a U-shaped work surface as shown at 47 at work station 31.

Referring now in addition to FIGS. 4, 5 and 6 a turbine blade array such as that shown at 12 is illustrated in more detail and comprises a plurality of blades, e.g. 60, 61, 62, 63 etc.

The blades are shown having tenons such as 65 shown on blade 60 and the tenons extend into a cover band part of which is shown at 66.

The blades are shown as having erosion damage at the outer end of their leading edge, the type of damage that is very common in the low pressure stages of a steam turbine and in order to effect a repair it is necessary to cut away the damaged material and replace it by a new piece of material, or build up by weld passes, which is welded into position.

In order to carry out such an operation it is first desirable to remove the shroud 66 from around the ends of the turbine blades and then remove the lacing wire which is shown at 67.

Whereas misalignment of the blade prior to removal of the lacing wire 67 and cover band 66 may only have been slight, as soon as the shroud is removed and the lacing wire 67 the blades will tend to take up a misaligned position as shown in FIG. 5.

In order to align each blade such as the blade shown at 60, clamping means 68 and 69 may be provided to clamp the blade 60 relative to the work station 70 and physical force may be applied to the blade.

The physical force may be applied by any suitable means and in some cases may merely comprise manual manipulation of the blade by someone of adequate strength to pull or twist the blade into its aligned position. In other cases tools may be necessary and a lever may be used, the work station may incorporate means to provide a fulcrum for the lever and various other tools such as hydraulic rams may be used to twist the blade or bend it to its aligned position.

The nature of the blade itself, its length and strength and the amount of distortion dictating what tools may be necessary to effect the required alteration in the blade position.

FIG. 5 shows arrows A and B indicating a direction along which a force should be applied to cause the blade 60 to take up an aligned position.

As aforementioned, the aligned position has preferably been determined by carefully recording the position of a datum blade prior to removal of the rotor from the turbine so that all the blades in the array after any ties or damping means have been removed may be aligned to such datum position.

If desired the application of heat, for example a blow torch shown at 71 or controlled heat using electrically energised heating means and suitable control means may be applied to various parts of the blade to enable the blade to be bent, twisted or otherwise distorted to take up its correct aligned position.

Each of the blades in the array are then acted upon in a similar manner so that they take up a proper aligned position, which aligned position may be checked by use of alignment means such as those shown at 72, 73, 74 and 75 secured to the work station 70 and for example in order to check the aligned position a feeler gauge may be used between alignment rods 72 to 75.

Once the blades are all in their aligned positions, the repair process may be carried out for example by cutting away damaged material and, since the blades are all in an identical position automatically operated machining apparatus may be used, which apparatus will, because of the aligned position of the blades, be capable of removing precisely the same size piece of material from each blade.

It will be appreciated that whereas the support apparatus as shown in the drawings and described above is of considerable assistance in effecting alignment of the blades prior to a repair, if such apparatus is not available then in order to secure one blade relative to others, other clamping means may be provided so that at least part of the blade may be firmly held while another part is subjected to physical force to cause the blade to take up its proper aligned position.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A method of repairing turbine blades on a rotor, comprising the steps of:
   determining an aligned position of the turbine blades on the rotor;
   removing any inter-blade ties necessary to be removed to enable repair operations to be carried out on the blades; and
   acting on any out-of-aligned blade to return it to its aligned position prior to cutting, machining or welding of the blade during said repair operation; and carrying out any repair steps necessary to repair the blade.

2. A method of repairing turbine blades on a rotor according to claim 1 wherein prior to removing any inter-blade ties a blade is located which is known to be in a substantially optimum position and such blade is used as a datum blade to establish an aligned position.

3. A method according to claim 2 wherein said rotor after removal from said turbine is placed on a worktable and prior to removal of any inter-blade ties, the position of said datum blade relative to the worktable is carefully noted and recorded.

4. A method of repair according to claim 1 wherein the acting on any out-of-aligned blade to return said blade to an aligned position is carried out by the application of physical force to the blade.

5. A method of repairing turbine blades according to claim 4 including the step of applying heat to at least one area of the blade to facilitate re-alignment of the blade from an out of aligned position to its aligned position.

6. A method of repairing turbine blades on a rotor comprising the steps of:
   removing the rotor from a turbine;
   mounting the rotor on a stand;
   positioning a work table alongside at least one of the blades on the rotor;
   providing means to prevent movement of said rotor relative to said work table;
   determining an aligned position of the turbine blades on the rotor;
   removing any ties necessary to be removed to enable repair steps to be carried out to the blades;
   acting on each blade out of the predetermined aligned position to return it to its aligned position; and
   carrying out any repair step necessary to repair the blade.

7. A method of repair according to claim 6 further comprising the step of carrying out a heat treatment process to each blade where substantial force has been necessary to move said blade from a misaligned position to a predetermined aligned position.

8. A method of repair according to claim 6 including the further steps of carrying out a work operation on a blade, rotating said rotor to bring another blade adjacent to said work table and carrying out a repair operation on said further blade.

9. A method of repair according to claim 6 wherein said work table is provided with means adapted to engage with at least one of said blades to prevent movement of that part of the blade engaged by said means relative to said work table so as to prevent distortion or movement of that part of the blade engaged by said engagement means during the application of force or heat to other parts of the blade to bring the blade to its aligned position.

10. A method of repair according to claim 1 wherein said aligned position is different from an in-use aligned position and is predetermined to take into account distortion expected to occur during the execution of a known repair step such that after said repair step the blade will be in its approximately in-use aligned position.

11. A method of repair according to claim 1 wherein said repair step includes the securing of additional metal to a leading edge of the turbine blade.

12. A method of repair according to claim 1 wherein a stress relieving heat treatment process is carried out to the blade after said repair operation.

13. A method of repair according to claim 6 wherein said aligned position is different from an in-use aligned position and is predetermined to take into account distortion expected to occur during the execution of a known repair step such that after said repair step the blade will be in its approximately in-use aligned position.

14. A method of repair according to claim 6 wherein said repair step includes the securing of additional metal to a leading edge of the turbine blade.

15. A method of repair according to claim 6 wherein a stress relieving heat treatment process is carried out to the blade after said repair operation.

* * * * *